United States Patent
Jonsson

(10) Patent No.: US 7,558,314 B2
(45) Date of Patent: Jul. 7, 2009

(54) METHOD AND DEVICE FOR DETECTION OF A UMTS SIGNAL

(75) Inventor: Elias Jonsson, Malmö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 715 days.

(21) Appl. No.: 10/527,896

(22) PCT Filed: Aug. 29, 2003

(86) PCT No.: PCT/EP03/09657

§ 371 (c)(1),
(2), (4) Date: Sep. 28, 2005

(87) PCT Pub. No.: WO2004/028019

PCT Pub. Date: Apr. 1, 2004

(65) Prior Publication Data

US 2006/0140255 A1 Jun. 29, 2006

Related U.S. Application Data

(60) Provisional application No. 60/414,055, filed on Sep. 27, 2002, provisional application No. 60/482,673, filed on Jun. 26, 2003.

(30) Foreign Application Priority Data

Sep. 23, 2002 (DK) .............................. 2002 01400
Jun. 12, 2003 (EP) .................................. 03388044

(51) Int. Cl.
*H04B 1/707* (2006.01)

(52) U.S. Cl. ..................................... 375/148

(58) Field of Classification Search .............. 375/148, 375/340, 342–343, 346, 349–350; 370/465, 370/473, 503, 509
See application file for complete search history.

(56) References Cited

U.S. PATENT DOCUMENTS 5,619,524 A * 4/1997 Ling et al. .................. 375/130
7,369,577 B2 * 5/2008 Darbel et al. ................ 370/503
7,430,192 B1 * 9/2008 Snodgrass et al. ........... 370/337
2001/0026543 A1   10/2001 Hwang et al.
2003/0043946 A1 *  3/2003 Kim et al. .................... 375/358
2003/0072277 A1 *  4/2003 Subrahmanya et al. ...... 370/320
2004/0202231 A1 * 10/2004 Wang et al. .................. 375/148

FOREIGN PATENT DOCUMENTS

EP          1 170 880         1/2002

OTHER PUBLICATIONS

"Universal Mobile Telecommunications System (UMTS): Physical channels and mapping of transport channels onto physical channels (FDD) (3GPP) TS 25.211 version 4.3.0 Release 4)"ETSI TS 125 211 V4.3.0, Dec. 2001, XP002263982 Sophie Antipolis, FR cited in the application paragraph '5.3.3.7!.

* cited by examiner

*Primary Examiner*—Khanh C Tran
(74) *Attorney, Agent, or Firm*—Michael Cameron

(57) ABSTRACT

The present invention relates to a method (and corresponding device) of detecting a first signal in a received signal using a pattern, the received signal comprising at least one signal group, each signal group comprising a number of signal symbols, the pattern comprising at least one pattern group, each pattern group comprising at least a number of pattern symbols, wherein the method comprises the steps of for each signal group multiplying each signal symbol with a corresponding pattern symbol of a pattern group and deriving a sum of the products of multiplication, applying a weight factor of one or more weight factors to each sum giving a weighted sum, where said one or more weight factors are selected to preserve an orthogonality relation of said pattern symbols of the least one pattern group, and determining if a signal is detected or not based on said one or more weighted sums.

21 Claims, 4 Drawing Sheets

Figure 5

METHOD AND DEVICE FOR DETECTION OF
A UMTS SIGNAL This patent application claims the benefit of priority from U.S. Provisional Patent Application Ser. No. 60/414,055 filed on Sep. 27, 2002, and U.S. Provisional Patent Application Ser. No. 60/482,673 filed on Jun. 26, 2003. This application incorporates by reference the entire disclosure of U.S. Provisional Patent Application Ser. Nos. 60/414,055 and 60/482,673.

FIELD OF THE INVENTION

The present invention relates to a method and device for detection of a signal in a communications system.

BACKGROUND OF THE INVENTION

The detection of the Acquisition Indicator Channel (AICH) according to 3rd generation partnership project (3GPP) specifications is part of the random access procedure. The procedure can be described as follows. In order for a terminal or a user equipment (UE) to send a Random Access Channel (RACH) message, it first needs to decode the Broadcast Channel (BCH) to find out what are the available RACH sub-channels, scrambling codes, and signatures. The UE selects randomly one of the RACH sub-channels from the group its access class allows it to use. This implies a restriction on when a RACH preamble can be sent. Then the signature is selected randomly. There are sixteen signatures available, which means that sixteen UE can send at the same time. The downlink power level is then measured and the uplink power level is set with proper margin due to open loop inaccuracy. A 1 ms RACH preamble is sent with the selected signature. The UE then listens for a confirmation from the base-station. The confirmation is sent through the AICH. In case no AICH is detected, the UE increases the preamble transmission power by a step given by the base station. The preamble is then retransmitted in the next available access slot. When finally an AICH transmission from the base-station is detected in the UE, the UE transmits the 10 ms or 20 ms message part of the RACH transmission.

A RAKE receiver is typically used in digital wireless communication systems to improve the performance of a CDMA (Code-Division Multiple Access) receiver by utilizing signal energy carried by many multipath components. In a RAKE receiver this is achieved by letting each multipath component be assigned a despreader whose reference copy of the spreading code is delayed equally to the path delay of the corresponding multipath component. The outputs of the de-spreaders (fingers) are then coherently combined to produce a symbol estimate. The RAKE receiver uses knowledge of the multipath delays and the values of the channel impulse response for all paths.

One prior art method of and device for signal detection simply uses a summation of the sent AICH symbols, which is less robust and does not provide reliable detection, especially when a detector moves at a relatively high speed due to fading.

EP 1 170 880 discloses a radio base station device and radio communication method that enables adaptive array antenna (AAA) reception by a RACH and AAA transmission by an AICH and reduced interference with other base stations.

However, this device and method does not provide reliable detection when moving at relatively high speed, since the problem of avoiding the effects of fading that makes the signal strength vary is not addressed. Further weights are not derived. Instead an already known signal section (preamble section) of the RACH is used.

OBJECT AND SUMMARY OF THE INVENTION

An object of the present invention is to provide a complete method of and a device usable for AICH detection and/or detection of other types of signals.

A further object of the present invention is to provide a detection method and a detection device that enables detection of an acquisition signal or another type of signal even when the physical detector is moved at a relatively large velocity.

An additional object of the present invention is to provide a detection method and a detection device having a more robust detection of a signal.

A further object of the present invention is to provide a threshold for detection vs. no detection of an acquisition signal or another type of signal.

These objects, among others, are achieved by a method of detecting a first signal in a received signal using a pattern, the received signal comprising at least one signal group, each signal group comprising a number of signal symbols, the pattern comprising at least one pattern group, each pattern group comprising a number of pattern symbols, wherein the method comprises the steps of:

for each signal group multiplying each signal symbol with a corresponding pattern symbol of a pattern group and deriving a sum of the products of multiplication, applying a weight factor of one or more weight factors to each sum giving a weighted sum, where said one or more weight factors are selected to preserve an orthogonality relation of said pattern symbols of the at least one pattern group, and determining if a signal is detected or not based on said one or more weighted sums.

In this way, a complete method of reliable detection is provided. Further, a detection method is provided that enables robust detection of an acquisition signal or another similar type of signal even when the physical detector is moved at a relatively large velocity, since orthogonality of the pattern is preserved due to the applied weight factors, even when fading makes the signal strength vary within the duration of the signature pattern that may cause false detections.

In one embodiment, the step of determining if a signal is detected or not comprises
adding said one or more weighted sums giving a first result, and
comparing said first result with a detection threshold in order to determine whether said signal is detected or not.

In one embodiment, the detection threshold is derived based on a signal to interference ratio of a common pilot channel (CPICH).

In an alternative embodiment, the detection threshold is derived based on a signal to interference ratio, where the interference is estimated on the basis of symbols of the received signal (y) that should be zero. In this way, a simple estimation of the interference may be obtained, since the specific value of the symbols that is known to be zero arises due to noise/interference.

In one embodiment, the detection threshold is derived based on a false detection rate factor and a standard deviation of the interference of the received signal.

In one embodiment, the one or more weight factors are derived on the basis of a signal to interference ratio (SIR) calculated for a common pilot channel (CPICH).

In one embodiment, the signal to interference ratio (SIR) calculated for a common pilot channel (CPICH) is dependent on an estimate of the interference for a given finger and a given group, where said method further comprises the step of:

averaging the estimate of the interference over a predetermined number of groups (j) before deriving said one or more weight factors on the basis of the signal to interference ratio (SIR) calculated for the common pilot channel (CPICH).

This reduces the uncertainty of the interference estimates enabling a better detection.

Preferably, the first signal is an acquisition indicator channel (AICH) signal or a collision detection/channel assignment indicator channel (CD/CA-ICH).

In one embodiment, the received signal is an estimated signal derived on the basis of one or more weighted channel estimates and of de-spread symbols from a RAKE, wherein the one or more weighted channel estimates are based on a common pilot channel (CPICH).

In a preferred embodiment, the received signal (y) comprises two or three signal groups and the pattern (ŝ) comprises at least two or three pattern groups. The use of two or more groups and thereby two or more weight factors (x) enables a correction of the otherwise destroyed orthogonality and thereby elimination of false and/or unreliable detection at even higher velocities.

The invention also relates to a device for detecting a first signal in a received signal using a pattern, the received signal comprising at least one signal group, each signal group comprising a number of signal symbols, the pattern comprising at least one pattern group, each pattern group comprising at least a number of pattern symbols, wherein the device comprises:

means adapted to for each signal group to multiply each signal symbol with a corresponding pattern symbol of a pattern group and to derive a sum of the products of multiplication, means for applying a weight factor of one or more weight factors to each sum giving a weighted sum, where said one or more weight factors are selected to preserve an orthogonality relation of said pattern symbols of the at least one pattern group, and means for determining if a signal is detected or not based on said one or more weighted sums.

In one embodiment, the means for determining if a signal is detected or not further comprises a summation circuit for adding said one or more weighted sums giving a first result, and detection means for comparing said first result with a detection threshold in order to determine whether said signal is detected or not.

In one embodiment, the device further comprises processing means for deriving said detection threshold based on a signal to interference ratio of a common pilot channel.

In one embodiment, the device further comprises processing means for deriving said detection threshold based on a false detection rate factor and a standard deviation of the interference of the received signal.

In an alternative embodiment, the device further comprises processing means for deriving said detection threshold on the basis of a signal to interference ratio and for estimating the interference on the basis of symbols of the received signal that should be zero.

In one embodiment, the device further comprises processing means for deriving one or more weight factors on the basis of a signal to interference ratio calculated for a common pilot channel (CPICH).

In one embodiment, the signal to interference ratio (SIR) calculated for a common pilot channel (CPICH) is dependent on an estimate of the interference for a given finger and a given group, and said processing means is further adapted to:

average the estimate of the interference over a predetermined number of groups before deriving said one or more weight factors on the basis of the signal to interference ratio (SIR) calculated for the common pilot channel (CPICH).

In one embodiment, the first signal is an acquisition indicator channel (AICH) signal or a collision detection/channel assignment indicator channel (CD/CA-ICH).

In one embodiment, the device further comprises a combiner circuit for deriving said received signal as an estimated signal derived on the basis of one or more weighted channel estimates and of de-spread symbols from a RAKE, wherein the one or more weighted channel estimates is based on a common pilot channel (CPICH).

In one embodiment, the received signal comprises two or three signal groups and that the pattern comprises at least two or three pattern groups.

Further, the invention also relates to a computer readable medium having stored thereon instructions for causing one or more processing units to execute the method according to the present invention.

The signal detection is essentially a correlation. Judging from the size of the correlation output we determine if we have detected a signal or not. This requires a threshold to distinguish detection from no detection, which is part of the present invention.

The present invention splits up a received signal into parts, assigns a weight factor to each part, sums the weighted parts and uses a threshold in order to determine whether a given signal is detected or not.

Embodiments of the invention could advantageously be part of a baseband chip in UMTS terminals. Generally, the invention may be useful in all markets or products relating to UMTS terminals, user equipments, mobile phones, smart phones, PDA's, etc.

Although, AICH detection is used throughout this specification, the invention may also be used for detecting other types of signals with similar properties. As one example of such a signal is the Collision Detection/Channel Assignment Indicator Channel (CD/CA-ICH) according to the 3rd generation partnership project (3GPP) specifications. CD/CA-ICH was also previously denoted CD-ICH.

BRIEF DESCRIPTION OF THE DRAWINGS

Figure 5:
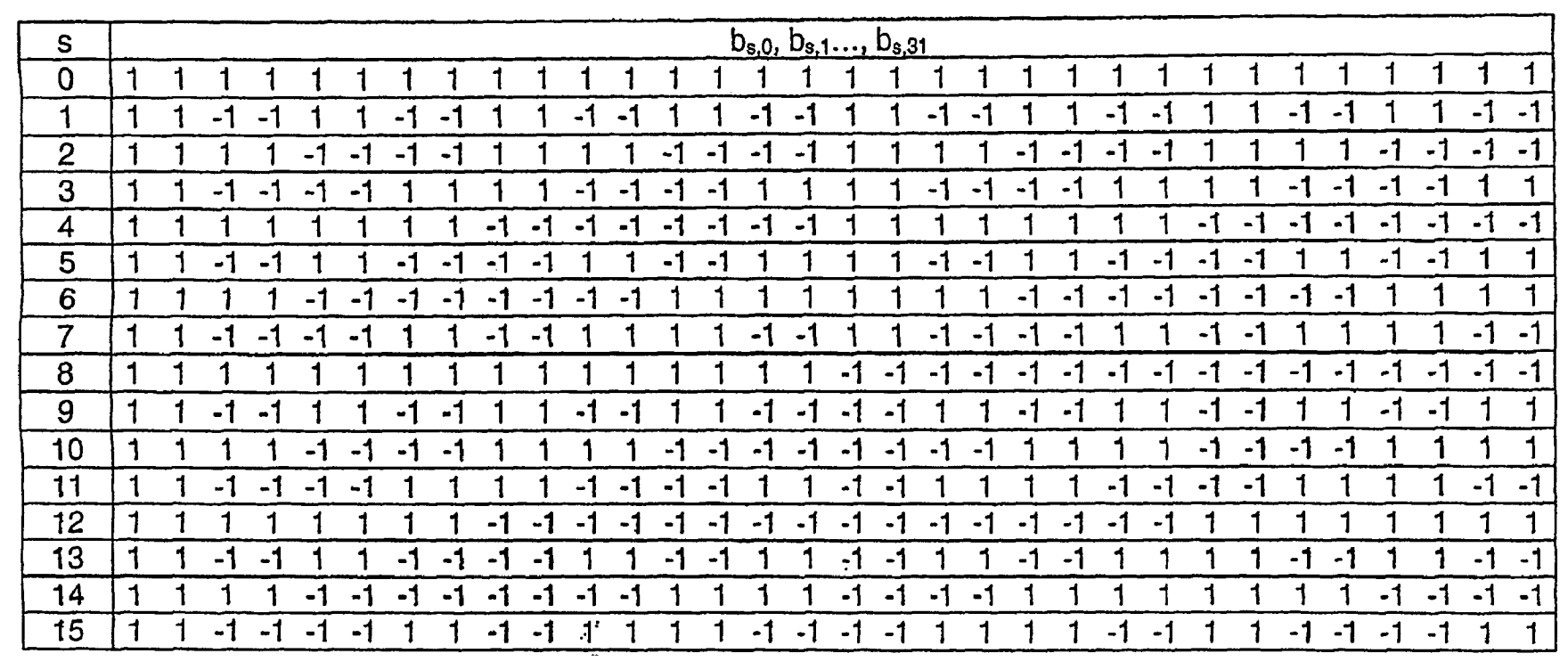

FIG. 5 illustrates a number of AICH signature patterns according to 3GGP TS 25.211 V4.3.0 (2201-12).

DETAILED DESCRIPTION OF THE INVENTION

Figure 1:
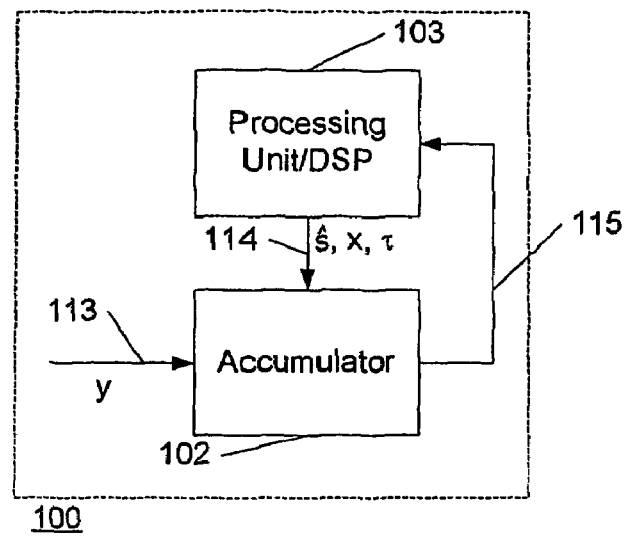
FIG. 1 illustrates a schematic block diagram of a general embodiment of a detection circuit according to the present invention.

FIG. 1 illustrates a schematic block diagram of a general embodiment of a detection circuit according to the present invention. A detection circuit (100) for detecting a specific signal in a symbol sequence is shown, where the circuit (100) comprises an accumulator circuit (102) and a processing unit (103), the processing unit (103) e.g. comprising at least one general purpose and/or at least one special purpose processing unit and/or at least one digital signal processor (DSP).

The accumulator circuit (102) receives a signal (y) via a connection (113), where the signal (y) comprises the symbols on which signal detection is to be performed and further receives a signal via another connection (114) from the DSP (103), where this signal comprises a sequence, signature, pattern or the like (ŝ) (henceforth only denoted pattern), comprising a number of symbols. The symbols of the signal (y) may be grouped in one or more groups (i.e. J groups, where J is a positive integer being equal to or larger than 1), where each group comprises a number of symbols and preferably is processed independently of the other groups, if any, of the signal (y). Different groups may e.g. comprise a different number of symbols, Alternatively, all the groups may comprise the same number of symbols. Together, all the groups comprise L symbols, e.g. forming the symbols of a signal access slot, where L is at positive integer.

The pattern (ŝ) preferably comprises at least as many symbols as the number of symbols of the signal (y), i.e. at least L symbols. The pattern (ŝ) may also be grouped in one or more groups comprising a same or a different number of symbols. Preferably, the pattern (ŝ) is grouped or split up in as many groups as are the symbols of the signal (y) in which detection of a signal is to be performed, i.e. J groups and preferably a given group of the pattern (ŝ) is used in connection with a given group of the signal (y).

In one embodiment, the symbols of the signal (y) are organised in two blocks, i.e. J=2, where the first black comprises 10 symbols and the second block comprises 6 symbols. In this embodiment, the pattern (ŝ) would comprise 16 symbols, and would preferably be split into two groups (ŝ$^{(1)}$ and ŝ$^{(2)}$), where (ŝ$^{(1)}$) comprises 10 symbols and (ŝ$^{(2)}$) comprises 6 symbols. Alternatively, other groupings of the signal (y) and/or the pattern (ŝ) may be used.

Preferably, a number of weight factors (x), are also received by the accumulator circuit (102) from the processing unit/DSP (103) via connection (114) or alternatively from another unit and/or via another connection (not shown). Preferably, one weight factor ($x_j$) for each symbol group is received, i.e. $x_j$, j∈1, . . . , J. In one embodiment, the weight factor(s) (x) are generated on the basis of a signal to interference ratio (SIR), e.g. as explained later in connection with FIG. 3. The purpose of the weight factors is to maintain orthogonality of the symbol groups e.g. in order to compensate for the presence of fading, which otherwise easily destroys the orthogonality and thereby a reliable detection of the signal.

In the accumulator circuit (102) each symbol of the signal (y) is multiplied with a corresponding symbol from the pattern (ŝ). A weight factor (x) is applied to each of the resulting L products after which a sum of the weighted products is generated resulting in a result denoted first result. Different or same weight factors (x) may be applied to the resulting products. Hence $$\text{First result} = \sum_{l=1}^{L} x_l y_l \hat{s}_l,$$

where l enumerates the symbols of the signal (y) and the symbols of the pattern (ŝ).

Preferably, the accumulator circuit (102) operates on groups of symbols instead of directly on specific symbols where each symbol of a given group is applied the same weight factor ($x_j$), i.e. the symbols of a given group of the signal (y) and the symbols of a given group of the pattern (ŝ) are multiplied preferably on a symbol-level (i.e. the first symbol of the given signal group is multiplied with the first symbol of the given pattern group, etc.) and where the resulting products are added in order to generate a sum after which a weight factor ($x_j$) is applied to the resulting sum. If both the group of the signal (y) and the pattern (ŝ) are in vector-form, this corresponds to taking the scalar product and applying a weight factor. After this has been done, the resulting weighted sums for each block are added to give the first result. Hence $$\text{First result} = \sum_{j=1}^{J} x_j \sum_{k=1}^{K} y_k^{(j)} \hat{s}_k^{(j)}$$

if every block of both the signal (y) and the pattern (ŝ) comprises K symbols (or if there are K symbols in the largest block(s) and the remaining other blocks have zeroes inserted to give them a size of K symbols).

In the embodiment, where the symbols of the signal (y) is organised in two blocks, i.e. J=2, where both the first block of the signal (y) and the first part of the pattern (ŝ) comprises 10 symbols and where the second block of the signal (y) and the second part of the pattern (ŝ) comprises 6 symbols, the first result would be:

$$\text{First result} = x_1 \sum_{k=1}^{10} y_k^{(1)} \hat{s}_k^{(1)} + x_2 \sum_{k=1}^{6} y_k^{(2)} \hat{s}_k^{(2)}$$

where $y_k^{(j)}$ is the k'th symbol in block j for the signal (y) and $\hat{s}_k^{(j)}$ is the k'th symbol in block j for the pattern (ŝ).

The first result is then compared with a threshold (τ) received in the accumulator circuit (102) from the DSP (103), via connection (114) or alternatively from another unit and/or via another connection (not shown), in order to determine whether the specific signal is detected or not. The result of the detection is preferably sent from the accumulator circuit (102) via a connection (115) to the DSP, or alternatively to another unit (not shown), for further use, processing, etc.

In one embodiment, the detection threshold (τ) is dependent on a probability for false detections (FAR) and the resulting FAR-dependent threshold is denoted $\tau_{FAR}$ in the following.

The function of the units of the detection circuit (100) may be modified depending on the characteristics of the signal (y) on which signal detection is to be performed. As an example, the function of the units may be modified to take into account the different fingers (f) in a RAKE receiver, each corresponding to a path along which the signal (y) travels between the transmitter and the receiving terminal. This complicates the factors involved, but the above mentioned principle is the same. This is explained in greater detail in connection with FIG. 3 where detection of an Acquisition Indicator Channel (AICH) according to 3rd generation partnership project (3GPP) specifications is described.

Figure 2A:
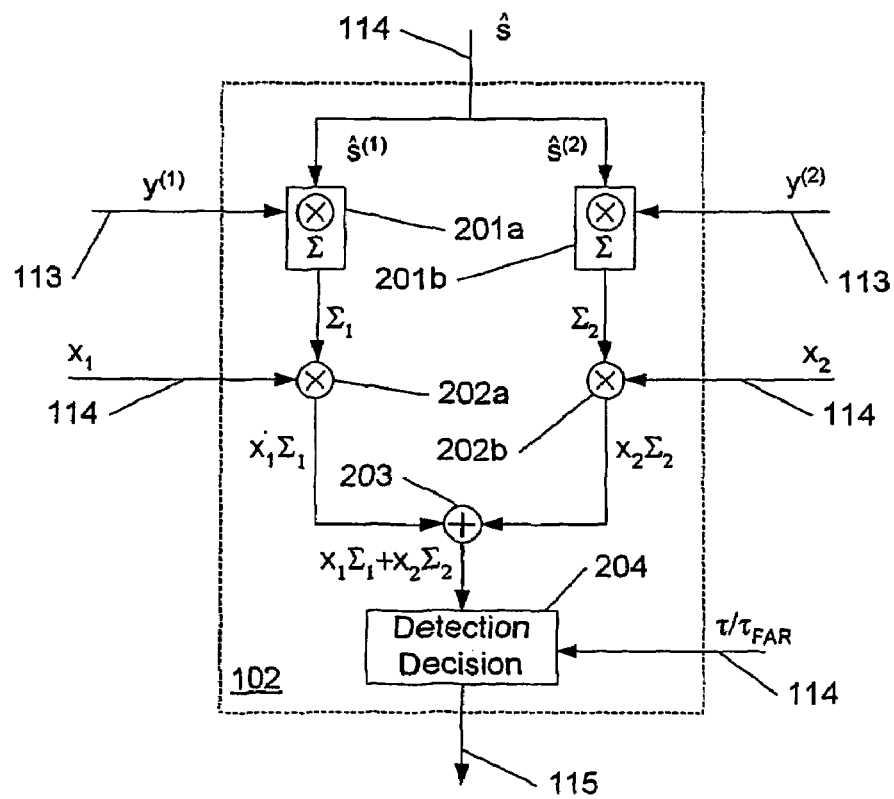
FIG. 2a illustrates a more detailed schematic block diagram of an accumulator circuit according to one embodiment of the present invention.

FIG. 2a illustrates a more detailed schematic block diagram of an accumulator circuit according to one embodiment of the present invention. An accumulator circuit (as shown in FIG. 1) for detection of a signal is shown. In this exemplary embodiment, both the signal (y), on which detection is to be performed, and the pattern (ŝ) are arranged in two groups ($y^{(1)}$), ($y^{(2)}$) and ($\hat{s}^{(1)}$), ($\hat{s}^{(2)}$), respectively. The pattern (ŝ) is received via connection (114) from a processing unit, DSP or the like (not shown) and is received in the two groups ($\hat{s}^{(1)}$, $\hat{s}^{(2)}$) or split into these by the accumulator circuit (102). Further, the signal (y) is received via connection (113) in the two groups ($y^{(1)}$, $y^{(2)}$) or split into these by the accumulator circuit (102). The first group of both the signal ($y^{(1)}$) and the pattern ($\hat{s}^{(1)}$) are received by a first accumulator circuit/function (201a), that multiplies each symbol of ($y^{(1)}$) with a corresponding symbol of ($\hat{s}^{(1)}$). After multiplication, the resulting symbol products ($y^{(1)}\hat{s}^{(1)}$) are added together resulting in a first sum ($\Sigma_1$).

Likewise, the second group of both the signal ($y^{(2)}$) and the pattern ($\hat{s}^{(2)}$) are received by a second accumulator circuit/function (201b), that multiplies each symbol of ($y^{(2)}$) with a corresponding symbol of ($\hat{s}^{(2)}$), and adds the products together resulting in a second sum ($\Sigma_2$).

A first weight factor ($x_1$) (received via connection (114) from the processing unit/DSP) is applied to the first sum ($\Sigma_1$) by a first multiplication circuit/function (202a).

In the same way, a second weight factor ($x_2$) (also received from the processing unit/DSP (103)) is multiplied with the second sum ($\Sigma_2$) by a second multiplication circuit/function (202b).

An adding circuit/function (203) adds the two weighted sums together and the result of this addition, i.e. the first result, ($x_1 \Sigma_1 + x_2 \Sigma_2$) is used by a decision circuit/function (204) to determine whether a given signal is detected or not.

In one embodiment, the decision circuit/function (204) compares the first result with a threshold ($\tau$, $\tau_{FAR}$) in order to determine whether a specific signal is detected or not.

The symbols are weighted by the weight factors ($x_1$, $x_2$) in order to mitigate the influence of fading over an access slot, the access slot comprising all the groups.

In alternative embodiments, the accumulator circuit (102) may comprise a single accumulator or more than two accumulators corresponding to the ones shown (201a and 201b), i.e. J accumulators. In another alternative embodiment, the accumulator circuit (102) comprises only a single accumulator processing a group at a time out of the J groups. Such an embodiment is shown and explained in connection with FIG. 2b and has the advantage of reduced hardware complexity.

The use of two (or more) groups is useful if the terminal is moving at a high velocity, since fading could destroy the orthogonality of the pattern (ŝ) if only a single group was used for the entire signal (y) and pattern (ŝ). J=1 could be sufficient for relatively smaller velocities of the terminal, while J=2 or J=3 (or under certain situations even higher) would be required for reliable detection at higher velocity.

Figure 2B:
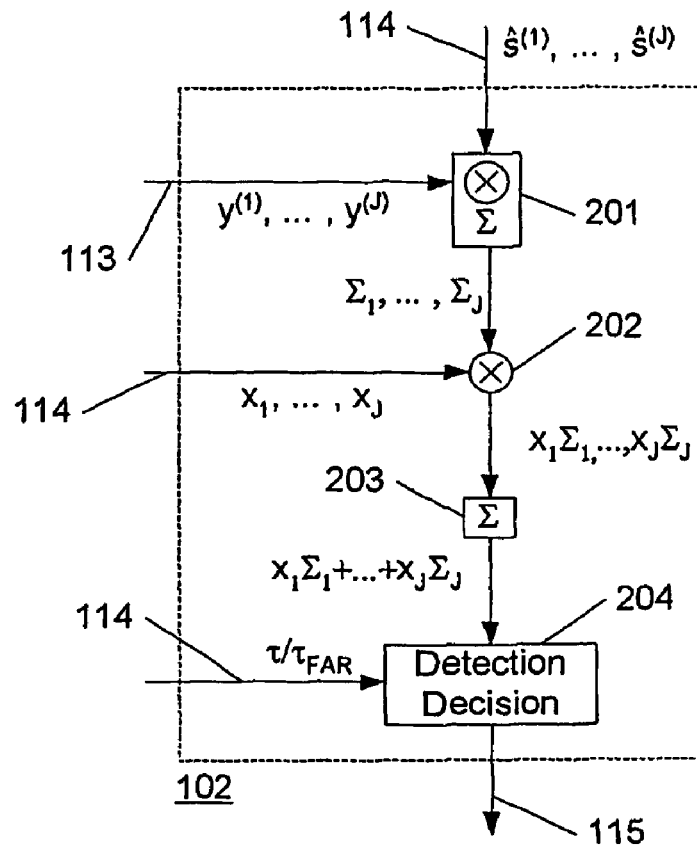
FIG. 2b illustrates a more detailed schematic block diagram of an accumulator circuit according to a preferred embodiment of the present invention.

FIG. 2b illustrates a more detailed schematic block diagram of an accumulator circuit according to a preferred embodiment of the present invention. An accumulator circuit (as shown in FIG. 1) for detection of a signal is illustrated. In this exemplary embodiment, the accumulator circuit (102) function on a group basis in the sense that a group is processed at a time, i.e. in 'serial' as opposed to in 'parallel' as the embodiment in FIG. 2a. The accumulator circuit (102) comprises an accumulator circuit/function (201) that receives the symbols from a given group ($y^{(j)}$) of the signal (y) via connection (113) and the symbols from a given group ($\hat{s}^{(j)}$) of the pattern (ŝ) via connection (114) from a processing unit, DSP or the like (not shown). The accumulator circuit/function (201) multiplies each signal symbol of the given group ($y^{(j)}$) with a corresponding pattern symbol of the given group ($\hat{s}^{(j)}$). After multiplication, the resulting symbol products ($y^{(j)}\hat{s}^{(j)}$) are added together resulting in a sum ($\Sigma_j$).

A given weight factor ($x_j$) for the given group (received via connection (114) e.g. from the processing unit/DSP) is applied to the sum ($\Sigma_j$) by a multiplication circuit/function (202) giving a weighted sum ($x_j \Sigma_j$). The given weighted sum ($x_j \Sigma_j$) may be stored in a suitable memory (not shown) until all J groups have been processed. The given weight factor ($x_j$) may be pre-defined or generated on the basis of the signal (y) and/or the pattern ŝ, e.g. as explained in connection with FIG. 3 for the detection of an AICH signal.

After the given group j has been processed, the next group (if any) is processed in a similar manner until J groups have been processed and a corresponding weighted sum ($x_j \Sigma_j$) for each group have been derived, after which an adding circuit/function (203) adds the weighted sums together. The result of this addition, i.e. the first result, ($x_1 \Sigma_1 + \ldots + x_J \Sigma_J$) is used by a decision circuit/function (204) to determine whether a given signal is detected or not. In one embodiment, the decision circuit/function (204) compares the first result with a threshold ($\tau$, $\tau_{FAR}$) in order to determine whether a specific signal is detected or not. The adding circuit/function (203) may also add the generated weighted sums accumulatively, i.e. adding a generated weighted sum to the previous generated weighted sum(s) before the next weighted sum is derived, as this may save storage.

This embodiment uses less hardware than the one shown in FIG. 2a. Groups of both the signal (y) and the pattern (ŝ) may be received and stored (e.g. together with intermediate results) in one or more buffers, memory circuits, etc. (not shown) while a given group of both the signal (y) and the pattern (ŝ) is processed.

If the signal (y) is time dependent, i.e. one or more groups are available before others, as often is the case for a communications related signal, the drawback of not being able to process groups in parallel is very small, negligible or non-existent.

Figure 3:
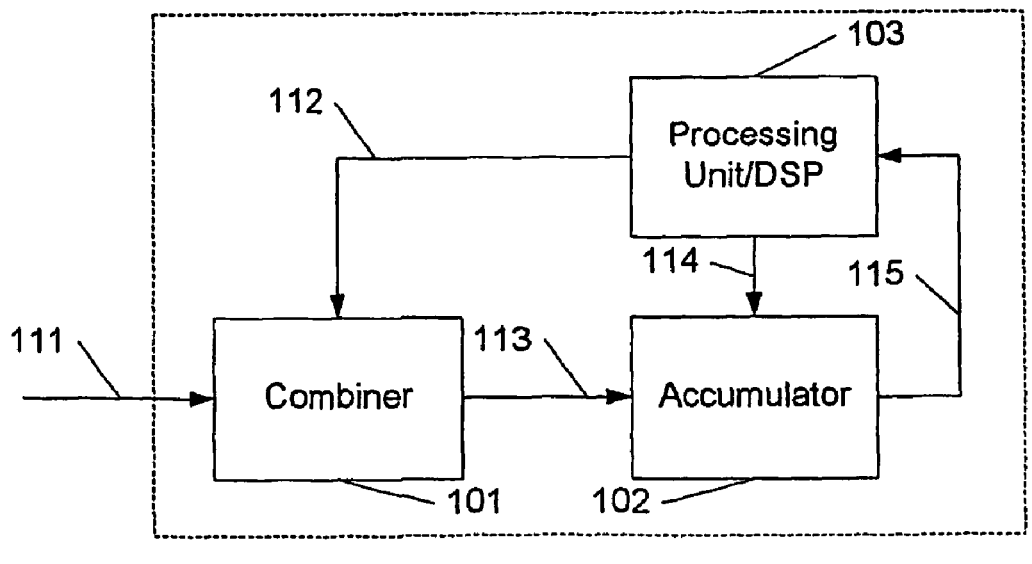
FIG. 3 illustrates a schematic block diagram of an embodiment of a detection circuit according to the present invention for detection of the Acquisition Indicator Channel (AICH)

FIG. 3 illustrates a schematic block diagram of an embodiment of a detection circuit according to the present invention for detection of an Acquisition Indicator Channel (AICH) according to 3rd generation partnership project (3GPP) specifications. Shown is a detection circuit (100) comprising a combiner circuit (101), an accumulator (102) and a processing unit (103), the processing unit (103) e.g. comprising at least one general purpose and/or at least one special purpose processing unit and/or at least one digital signal processor (DSP).

The accumulator (102) corresponds to the one shown and explained in connection with FIGS. 1 and 2 and the processing unit (103) corresponds to the one shown and explained in connection with FIG. 1.

The combiner (101) is connected to receive a signal via connection (111) from a RAKE and to receive a signal via connection (112) from the processing unit (103). The combiner (101) outputs a signal via connection (113) to the accumulator (102), which further receives a signal via connection (114) from the processing unit (103) and provides another signal via connection (115) to the processing unit (103).

Typically, the Acquisition Indicator Channel (AICH) according to the 3rd generation partnership project (3GPP) specifications is sent using a spreading factor of 256. A total of 16 symbols are sent during an access slot, which corresponds to 10 symbols in one group and 6 symbols in the next group. The duration of an access slot equals two groups. The real and imaginary parts of the sent symbols are equal. Up to 16 different symbol combinations can be sent. The different symbol combinations are orthogonal and are usually called signature patterns; see e.g. 3GPP, 3rd generation partnership project specifications, 3GPP TS 25.133, V3.3.0, June 2001. (incorporated herein by reference) and FIG. 5.

More specifically in connection to detection of the Acquisition Indicator Channel (AICH) according to 3GPP, 3rd generation partnership project specifications, the combiner (101) receives an AICH symbol signal via connection (111) comprising de-spread AICH symbols from the RAKE (not shown) and a signal (112) comprising weighted channel estimates (w), preferably based on the Common Pilot Channel (CPICH), from the processing unit/the DSP (103).

In the following, the index j enumerate groups of K symbols, where j=1, . . . , J and J is the smallest integer such that J×K≧16, where the number 16 is due to that there are 16 symbols in an access slot.

The despread AICH symbols of the AICH symbol signal are denoted $y_{k,f}^{(AICH)}$, where the index k enumerates the received symbols of a given group comprising K symbols and the index f∈[1, . . . , F] enumerates the multi-path delays or RAKE fingers. The received AICH symbols are after despreading given by $$y_{k,f}^{(AICH)} = h_{k,f} \sum_{\hat{s}=0}^{15} \frac{\alpha_{\hat{s}}}{\sqrt{2}} AI_{\hat{s}} b_{\hat{s},k} + n_{k,f}$$

where the index k enumerates the received symbols and the index f enumerates the multi-path delays or fingers, the radio channel is given by $h_{k,f}$, $\alpha_{\hat{s}}^2$ denotes the transmitted symbol energy of AICH signature ŝ, and the complex numbers $b_{\hat{s},k}=\pm$ (1+i) are the sent AICH symbols. The acquisition indicator for signature ŝ is given by $AI_{\hat{s}}$ and equals −1, 0 or 1. The interference is modelled by $n_{k,f}$. See FIG. 5 for the values of $b_{\hat{s},k}$ and ŝ, where ŝ=s and $b_{\hat{s},k}=b_{s,2k}+ib_{s,2k+1}$ since $b_{\hat{s},k}$ is complex numbers and $b_{s,n}$ in FIG. 5 gives the real and imaginary parts of these complex numbers.

If $AI_{\hat{s}}>0$, the base station acknowledges that it is aware of the terminal or the user equipment and a RACH can be sent. If $AI_{\hat{s}}=0$, the base station could not hear the terminal or the user equipment. Hence, the power of the preamble is increased before a new transmission is tried. If $AI_{\hat{s}}<0$, the base station heard the terminal or the user equipment, but instructs it to not send a RACH message.

For the CPICH, the received signal (not shown) after despreading is given by (using the approximation that the AICH and CPICH interferences are equal, which is reasonable since both transport channels have the same spreading factor)

$$y_{k,f}^{(CPICH)} = h_{k,f} \frac{\alpha_{CPICH}}{\sqrt{2}} c + n_{k,f}$$

where c is the complex number (1+i), the radio channel is given by $h_{k,f}$, the interference is modelled by $n_{k,f}$ and $\alpha_{CPICH}$ squared denotes the transmitted symbol energy for the CPICH signal.

In a preferred embodiment, statistics on the interference are estimated in the following on the basis on the CPICH, since in practice there are not enough AICH data samples. In an alternative embodiment, an estimation of the interference could be based on the fact that the last four symbols in an access slot are zero and hence $y_{k,f}^{(AICH)}$, k=16, 17, 18, 19 equals the interference. In this way, the detection threshold $(\tau, \tau_{FAR})$ may derived based on a signal to interference ratio, where the interference is estimated on the basis of symbols of the received signal (y) that should be zero.

The weighted channel estimates (based on the CPICH) are denoted $w_{k,f}$ for symbol k and finger f. The weighted channel estimates ($w_{k,f}$) may be derived on the basis of the channel estimate for each finger (f) weighted with its interference (see e.g. J. Proakis, Digital communications, McGraw-Hill Int. Edition, 3rd Ed, 1995 (incorporated herein by reference) for further details), i.e. the weighted channel estimates ($w_{k,f}$) may be given by (assuming that the radio channel $h_{k,f}$ is constant over K CPICH symbols)

$$w_{k,f} = w_f^{(j)} = \frac{\bar{h}_f^{(j)}}{N_f^{(j)}} \approx \frac{\alpha_{CPICH} h_{k,f}}{\sqrt{2} \sigma_f^2};$$

$$k = 1 + (j-1)K, \ldots, jK; j = 1, \ldots, J$$

where $\bar{h}_f^{(j)}$ is a radio channel estimate over group j, and $N_f^{(j)}$ is an estimate of the interference for finger f and group j, $\sigma_f^2$ is the variance of the interference.

As mentioned, the weighted channel estimates (w) are preferably derived in the processing unit/DSP (103) and supplied to the combiner (101).

A summation is done in the combiner (101) over the fingers f for $y_{k,f}^{(AICH)}$ multiplied by the complex conjugate of the weighted channel estimates, i.e.

$$\sum_{f=1}^{F} y_{k,f}^{(AICH)} w_{k,f}^*,$$

which is an estimate of the sent AICH symbol(s) and is the output signal (113) of the combiner (101). The estimate of the sent AICH symbol(s) would in the context of FIGS. 1 and 2 correspond to the signal (y). Up until now, the procedure is identical to what would have been done for a dedicated channel according to the 3rd generation partnership project (3GPP) specifications.

If the number of symbols in each group is small it is useful to average $N_f^{(j)}$ over a relatively small number of groups before the channel estimates are scaled with its inverse, i.e. before deriving the weighted channel estimates ($w_{k,f}$). This reduces the uncertainty of the interference estimates enabling a better detection.

The accumulator (102) receives the symbol(s)

$$\sum_{f=1}^{F} y_{k,f}^{(AICH)} w_{k,f}^*$$

via connection (113) from the combiner and receives from the processing unit/DSP (103) via connection (114) which pattern ŝ to use, where $b_{\hat{s},k}$ is the k'th symbol in the desired signature pattern ŝ. The specific pattern ŝ to use is picked randomly as specified in the 3GPP specification.

A first accumulator in the accumulator circuit (102) (corresponds to the general circuit/function 201a and 201b in FIGS. 2a and 2b) multiplies the combiner symbols in the first group with the corresponding signature pattern symbols $b_{\hat{s},k}$ (corresponding to $\hat{s}^{(1)}$ and $\hat{s}^{(j)}$ in FIGS. 2a and 2b, respectively) and adds the resulting products giving a first sum ($\Sigma_1$ and $\Sigma_j$ in FIGS. 2a and 2b, respectively). Then the remaining 6 symbols (for this particular example of AICH detection) in the second group are multiplied with the corresponding signature pattern symbols (corresponding to $\hat{s}^{(2)}$ and $\hat{s}^{(j)}$ in FIGS. 2a and 2b, respectively), the resulting products summed giving a second sum ($\Sigma_2$ and $\Sigma_j$ in FIGS. 2a and 2b, respectively) in a second or the same accumulator (corresponding to the circuit/function 201b in FIG. 2a or to the circuit/function (201) in FIG. 2b, respectively).

In this way, the de-rotated symbols are multiplied with $b_{\hat{s},k}$ (letting $b_{\hat{s},k}=0$ if the index k>16 for this particular example) and the results are added together in groups of K symbols, i.e.

$$A_j = \Sigma_j = Re \sum_{k=1+(j-1)K}^{jK} b_{\hat{s},k}^* \sum_{f=1}^{F} y_{k,f}^{(AICH)} w_{k,f}^*$$

A number of weight factors $\hat{C}_j$, j=1, ... J (corresponding to $1/x_1$ and $1/x_2$ of the embodiment shown in FIG. 2a where J=2 or $1/x_j$ of the embodiment shown in FIG. 2b where j∈(1, ..., J; J≧1)) are received by the accumulator (102) via connection (114) from the processing unit/DSP (103) and the result from the first accumulator, i.e. the first sum, is multiplied with the inverse of the first weight factor $\hat{C}_1$ while the result from the second or the same accumulator, i.e. the second sum, is multiplied with the inverse of the second weight factor $\hat{C}_2$. Preferably, the weight factors are derived from the signal to interference ratio (SIR), calculated for the CPICH.

$$\hat{C}_j = \frac{1}{x_j} = Re \sum_{f=1}^{F} (w_{k,j})^* \overline{h}_f^{(j)}$$

After the weight factors have been applied to the sums, the J resulting weighted sums are added giving a first result, i.e.

$$\text{First result} = \sum_{j=1}^{J} \frac{A_j}{\hat{C}_j}$$

In a preferred embodiment, the first result is given by $$\text{First result} = \sum_{j=1}^{J} C \frac{A_j}{\hat{C}_j}$$

where C is a variable aimed at making the division $A_j/\hat{C}_j$ more tractable. As an example C=max{$\hat{C}_1, ..., \hat{C}_J$}, as this reduces the computational complexity, especially important in equipment, devices, etc. with a limited power supply.

In effect, the accumulated values $A_j$ are scaled with the corresponding CPICH signal to interference ratio (SIR) (as approximated by $\hat{C}_j$), in order to remove the effect of the fading that would otherwise destroy the orthogonality of the patterns $\hat{s}$.

The determination of whether a signal is detected or not is based on said first result.

Preferably, the first result is compared to a threshold $\tau_{FAR}$ provided by the processing unit/DSP (103) and on the basis of the comparison a decision of the acquisition indicator $AI_{\hat{s}}$ is made. In one embodiment, this decision is done on the basis of the SIR for the CPICH and is provided to the processing unit/DSP (103) for further use.

In this way the acquisition indicator $AI_{\hat{s}}$ is given by $$AI_{\hat{s}} = \begin{cases} -1, & \sum_{j=1}^{J} C\frac{A_j}{\hat{C}_j} < -\tau_{FAR}, \\ 1, & \sum_{j=1}^{J} C\frac{A_j}{\hat{C}_j} > -\tau_{FAR}, \\ 0, & \text{else} \end{cases}$$

As mentioned earlier, the reason for using two or more groups in the accumulator circuit (102) is because a varying signal strength and/or fading destroys the orthogonality of the signature patterns $\hat{s}$, that may cause false detections. The use of two or more groups and thereby two or more weight factors (x) enable a correction of the otherwise destroyed orthogonality and thereby elimination of false and/or unreliable detection.

In this way, a complete method of and a device usable for AICH detection are provided. Further, a detection method and detection device are provided that enables robust detection of an acquisition signal or another similar type of signal even when the physical detector is moved at a relatively large velocity, since orthogonality in the pattern is preserved, even when fading makes the signal strength vary within the duration of the signature pattern.

In a preferred embodiment, the threshold $\tau_{FAR}$ is generated on the basis of the inverse of the SIR for the CPICH for symbol group j, i.e.

$$ISR_j^{(CPICH)} = \frac{1}{\sum_{f=1}^{F} \frac{|h_f^{(j)}|^2}{N_f^{(j)}}}$$

where $N_f^{(j)}$ estimates the interference for symbol block j and multi-path delay f.

Further, filtered values are derived $$ISR_{filt,j}^{(CPICH)} = (1-\lambda_{ISR})ISR_{filt,j-1}^{(CPICH)} + \lambda_{ISR}ISR_j^{(CPICH)}$$

where $\lambda_{ISR}$ is a predefined parameter e.g. set to 1/16.

Take $\sigma_\epsilon = \sqrt{8ISR_{filt,J}^{(CPICH)}}$, here $ISR_{filt,J}^{(CPICH)}$ represents the last filtered value in the access slot, and $\tau_{FAR} = Cl_{FAR}\sigma_\epsilon$ where $l_{FAR}$ is a predetermined false detection rate factor, then the acquisition indicator is given by the above mentioned expression.

Here $\sigma_\epsilon$ estimates the standard deviation of the interference of the signal given by the above-mentioned first result. Given that the interference can be modelled as Gaussian noise, $l_{FAR}$ may be selected dependent on a specific value for the probability for false detections (FAR), e.g. $l_{FAR}=1.6$ for FAR=0.1, $l_{FAR}$=2.2 for FAR=0.03 or $l_{FAR}$=2.6 for FAR=0.01. In practice, some fine tuning will typically always be needed, since the noise is not perfectly Gaussian.

Figure 4:
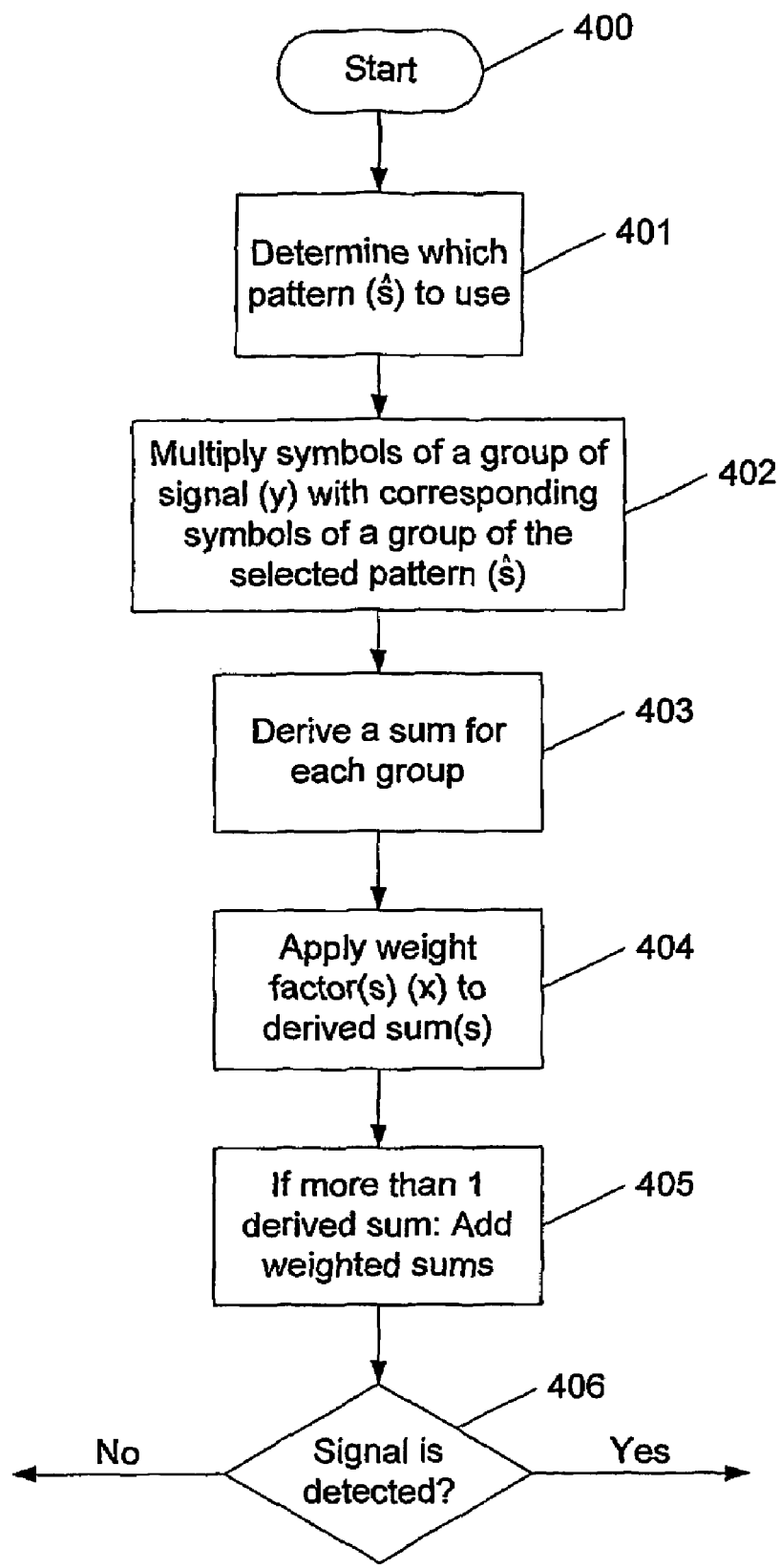
FIG. 4 illustrates a schematic flow chart of an embodiment of the method according to the present invention.

FIG. 4 illustrates a schematic flow chart of an embodiment of the method according to the present invention. The method starts and is initialised at step (400). At step (401), it is determined which pattern (ŝ) to use. The specific pattern ŝ to use is picked randomly as specified in the 3GPP specification.

At step (402), the symbols from a given group ($y^{(j)}$) of the signal (y) and the symbols from a given group ($ŝ^{(j)}$) of the pattern (ŝ) is multiplied as described earlier.

At step (403), the resulting symbol products ($y^{(j)}ŝ^{(j)}$) are added together resulting in a sum ($\Sigma_j$).

At step (404), a given weight factor ($x_j$) for the given group is applied to the sum ($\Sigma_j$) by a multiplication circuit/function (202) giving a weighted sum ($x_j\Sigma_j$). The weight factor may be pre-determined or derived as described elsewhere.

The steps (402, 403, and 404) may e.g. be performed in parallel on different groups as described in connection with FIG. 2a or in turn as described in connection with FIG. 2b.

After every group has been processed and a corresponding weighted sum ($x_j \Sigma_j$) for each group has been derived, the weighted sums (if more than 1) are added at step (405) giving a first result. If only a single weighted sum is generated the first result is that sum. Alternatively, the sum of the weighted sums may be generated gradually, e.g. initialising a variable to the first generated weighted sum and then adding to next generated weighted sums to this variable as they are generated.

At step (406), the first result is used to determine whether a given signal is detected or not. In one embodiment, a simple comparison is made between the first result and a threshold ($\tau, \tau_{FAR}$) in order to determine whether a specific signal is detected or not, as described elsewhere.

FIG. 5 illustrates a number of AICH signature patterns according to 3GGP TS 25.211 V4.3.0 (2201-12). In this figure a number of specific values ($b_{s,n}$; n∈0, . . . , 31) are listed for a number of signatures (s=ŝ; s∈0, . . . , 15) according to the 3GGP specification, where $b_{ŝ,k}=b_{s,2k}+ib_{s,2k+1}$.

It should be emphasized that the term "comprises/comprising" when used in this specification is taken to specify the presence of stated features, integers, steps or components but does not preclude the presence or addition of one or more other features, integers, steps, components or groups thereof.

Although preferred embodiments of the present invention have been described and shown, the invention is not restricted to them, but may also be embodied in other ways within the scope of the subject matter defined in the following claims.

What is claimed is:

1. A method of detecting, by a detection circuit of a receiver, a first signal in a received signal (y) using a pattern (ŝ), the received signal (y) comprising at least one signal group ($y^{(1)}, \ldots, y^{(J)}$), each signal group comprising a number (K) of signal symbols, the pattern (ŝ) comprising at least one pattern group ($ŝ^{(1)}, \ldots, ŝ^{(J)}$), each pattern group comprising at least a number (K) of pattern symbols, the method comprising:

multiplying, in an accumulator circuit, for each of said at least one signal group ($y^{(1)}, \ldots, y^{(J)}$), each signal symbol with a corresponding pattern symbol of said at least one pattern group ($ŝ^{(1)}, \ldots, ŝ^{(J)}$) and deriving a sum ($\Sigma_1, \ldots, \Sigma_J; A_j$) of the products of multiplication, receiving one or more weight factors ($x_1, \ldots, x_J; \hat{C}_j$) by the accumulator circuit from a processing unit/DSP;

applying a weight factor ($x_1, \ldots, x_J; \hat{C}_j$) of one or more weight factors ($x_1, \ldots, x_J; \hat{C}_j$) by the accumulator circuit to each sum ($\Sigma_1, \ldots, \Sigma_J; A_j$) giving a weighted sum ($x_1\Sigma_1, \ldots, x_J\Sigma_J; A_j/\hat{C}_j$), wherein said one or more weight factors ($x_1, \ldots, x_J; \hat{C}_j$) are selected to preserve an orthogonality relation of said pattern symbols of the at least one pattern group; and determining if a signal is detected or not based on said one or more weighted sums ($x_1\Sigma_1, \ldots, x_J\Sigma_J; A_j/\hat{C}_j$).

2. The method according to claim 1, wherein said step of determining if a signal is detected by a detection circuit of a receiver, comprises:

adding said one or more weighted sums ($x_1\Sigma_1, \ldots, x_J\Sigma_J; A_j/\hat{C}_j$) giving a first result ($x_1\Sigma_1,+ \ldots, +x_J\Sigma_J; A_j/\hat{C}_j; \Sigma_{j=1}^J CA_j/\hat{C}_j$); and comparing, by the accumulator circuit, said first result with a detection threshold ($\tau, \tau_{FAR}$) received from the processing unit/DSP in order to determine whether said signal is detected or not.

3. The method according to claim 2, wherein said detection threshold ($\tau, \tau_{FAR}$) is derived by the processing unit/DSP based on a signal to interference ratio of a common pilot channel (CPICH).

4. The method according to claim 2, wherein said detection threshold ($\tau, \tau_{FAR}$) is derived by the processing unit/DSP based on a signal to interference ratio, where the interference is estimated on the basis of symbols of the received signal (y) that should be zero.

5. The method according to claim 4, wherein said detection threshold ($\tau_{FAR}$) is derived by the processing unit/DSP based on a false detection rate factor ($l_{FAR}$) and a standard deviation ($\delta_{68}$) of the interference of the received signal (y).

6. The method according to claim 1, wherein said one or more weight factors ($x_1, \ldots, x_J; \hat{C}_j$) are derived by the processing unit/DSP on the basis of a signal to interference ratio (SIR) calculated for a common pilot channel (CPICH).

7. The method according to claim 6, wherein said signal to interference ratio (SIR) calculated for a common pilot channel (CPICH) is dependent on an estimate of the interference ($N_f^{(j)}$) for a given finger (f) of a RAKE receiver and a given group (j), where said method further comprising:

averaging the estimate of the interference ($N_f^{(j)}$) over a predetermined number of groups before deriving said one or more weight factors ($x_1, \ldots, x_J; \hat{C}_j$) on the basis of the signal to interference ratio (SIR) calculated for the common pilot channel (CPICH).

8. The method according to claim 1, wherein said first signal is an acquisition indicator channel (AICH) signal or a collision detection/channel assignment indicator channel (CD/CA-ICH).

9. The method according to claim 1, wherein said received signal (y) is an estimated signal ($\Sigma_{f=1}^F y_{k,f}^{(AICH)} w_{k,f}$) derived on a basis of one or more weighted channel estimates ($w_{k,f}$) and of de-spread symbols ($y_{k,f}^{(AICH)}$) from a RAKE, wherein the one or more weighted channel estimates ($w_{k,f}$) are based on a common pilot channel (CPICH).

10. The method according to claim 1, wherein said received signal (y) comprises two or three signal groups and that the pattern (ŝ) comprises at least two or three pattern groups.

11. The method of claim 1, wherein the method is embodied in computer code stored on a computer readable medium executed by a processor.

12. A device for detecting a first signal in a received signal (y) using a pattern (ŝ), the received signal (y) comprising at least one signal group ($y^{(1)}, \ldots, y^{(J)}$), each signal group comprising a number (K) of signal symbols, the pattern (ŝ) comprising at least one pattern group ($ŝ^{(1)}, \ldots, ŝ^{(J)}$), each pattern group comprising at least a number (K) of pattern symbols, the device comprises:

means adapted to for each of said at least one signal group ($y^{(1)}, \ldots, y^{(J)}$) to multiply each signal symbol with a corresponding pattern symbol of said at least one pattern group ($\hat{s}^{(1)}, \ldots, \hat{s}^{(J)}$) and to derive a sum ($\Sigma_1, \ldots, \Sigma_J; A_j$) of the products of the multiplication, means for applying a weight factor ($x_1, \ldots, x_J; \hat{C}_j$) of one or more weight factors ($x_1, \ldots, x_J; \hat{C}_j$) to each sum ($\Sigma_1, \ldots, \Sigma_J; A_j$) giving a weighted sum ($x_1\Sigma_1, \ldots, x_J\Sigma_J; A_j/\hat{C}_j$), where said one or more weight factors ($x_1, \ldots, x_J; \hat{C}_j$) are selected to preserve an orthogonality relation of said pattern symbols of the at least one pattern group, and means for determining if a signal is detected or not based on said one or more weighted sums ($x_1\Sigma_1, \ldots, x_J\Sigma_J; A_j/\hat{C}_j$).

13. The device according to claim 12, wherein said means for determining if a signal is detected or not further comprises:

a summation circuit for adding said one or more weighted sums ($x_1\Sigma_1, \ldots, x_J\Sigma_J; A_j/\hat{C}_j$) giving a first result ($x_1\Sigma_1, +\ldots, +x_J\Sigma_J; \Sigma_{j=1}^J CA_j/\hat{C}_j$); and detection means for comparing said first result with a detection threshold ($\tau$, $\tau_{FAR}$) in order to determine whether said signal is detected or not.

14. The device according to claim 13, wherein the device further comprises processing means for deriving said detection threshold ($\tau$, $\tau_{FAR}$) based on a signal to interference ratio of a common pilot channel (CPICH).

15. The device according to claim 13, wherein said device further comprises processing means for deriving said detection threshold ($\tau$, $\tau_{FAR}$) on the basis of a signal to interference ratio and for estimating the interference on the basis of symbols of the received signal (y) that should be zero.

16. The device according to claim 15, wherein the device further comprises processing means for deriving said detection threshold ($\tau$, $\tau_{FAR}$) based on a false detection rate factor ($l_{FAR}$) and a standard deviation ($\delta_\epsilon$) of the interference of the received signal (y).

17. The device according to claim 12, wherein the device further comprises processing means for deriving one or more weight factors ($x_1, \ldots, x_J; \hat{C}_j$) on the basis of a signal to interference ratio (SIR) calculated for a common pilot channel (CPICH).

18. The device according to claim 17, wherein said signal to interference ratio (SIR) calculated for a common pilot channel (CPICH) is dependent on an estimate of the interference ($N_f^{(j)}$) for a given finger (f) and a given group (j), where said processing means is further adapted to:

average the estimate of the interference ($N_f^{(j)}$) over a predetermined number of groups before deriving said one or more weight factors ($x_1, \ldots, x_J; \hat{C}_j$) on the basis of the signal to interference ratio (SIR) calculated for the common pilot channel (CPICH).

19. The device according to claim 12, wherein said first signal is an acquisition indicator channel (AICH) signal or a collision detection/channel assignment indicator channel (CD/CA-ICH).

20. The device according to claim 12, wherein the device further comprises a combiner circuit for deriving said received signal (y) as an estimated signal ($\Sigma_{f=1}^F y_{k,f}^{(AICH)} w_{k,f}$) derived on the basis of one or more weighted channel estimates ($w_{k,f}$) and of de-spread symbols ($y_{k,f}^{(AICH)}$) from a RAKE, wherein the one or more weighted channel estimates ($w_{k,f}$) is based on a common pilot channel (CPICH).

21. The device according to claim 12, wherein said received signal (y) comprises two or three signal groups and that the pattern ($\hat{s}$) comprises at least two or three pattern groups.

* * * * *